March 5, 1968  A. J. BEAUDETTE  3,371,936

HIGH PRESSURE PACKING

Filed March 31, 1965

United States Patent Office 3,371,936
Patented Mar. 5, 1968

3,371,936
HIGH PRESSURE PACKING
Alfred J. Beaudette, Wrentham, Mass., assignor to Harwood Engineering Co., Walpole, Mass., a corporation of Massachusetts
Filed Mar. 31, 1965, Ser. No. 444,146
2 Claims. (Cl. 277—117)

ABSTRACT OF THE DISCLOSURE

The disclosure of the invention comprises a packing for a high pressure cylinder unit interposed between the cylinder and piston walls including an annular leather packing, ring type headers of a hard non-yielding material having leather packing confining faces supporting each of the downstream and upstream sides of said leather packing, each said header having the leather packing confining face thereof extending between the cylinder and piston walls sloped inwardly toward the opposing header, said leather packing being conformed to provide a relatively short section of said leather packing engaging said piston peripheral surface and a substantially longer external surface engaging the internal peripheral surface of said cylinder, and an O-ring confined between the upstream face of said leather packing, the outer portion only of the leather packing confining face of the adjacent header and said internal peripheral surface of said cylinder, spring means interposed between said cylinder and piston walls at the upstream side of said packing for maintaining an initial pressure against said upstream header, O-ring, and leather packing, and shoulders on the internal surface of said cylinder engaging respectively the downstream header and said spring at the upstream side of the packing confining the packing assembly therebetween.

---

The present invention relates to an improved high pressure piston packing.

The packing is of a general type which comprises ring-type headers of a hard nonyielding material, and an interposed layer or layers of a yieldable abrasion resistant material such as leather. In order to obtain an initial seal as pressure is built up against the packing a more readily deformable packing material may be added and the entire assembly is held under compression, as by a coiled spring. As the pressures confined by such packings have increased, substantial difficulties have been encountered with both excessive wear and leakage through the packings.

It is a principal object of the invention to provide an improved high pressure piston packing of the general type referred to which operates instantly to effect an efficient high pressure seal with each successive pressure stroke of the piston, gives long life when operating at very high pressures, and is entirely dependable under any conditions likely to be encountered.

With the above and other objects in view as may hereinafter appear, the several features of the invention will be readily appreciated by one skilled in the art from the following description taken in connection with the accompanying drawing, in which.

Figure 1:
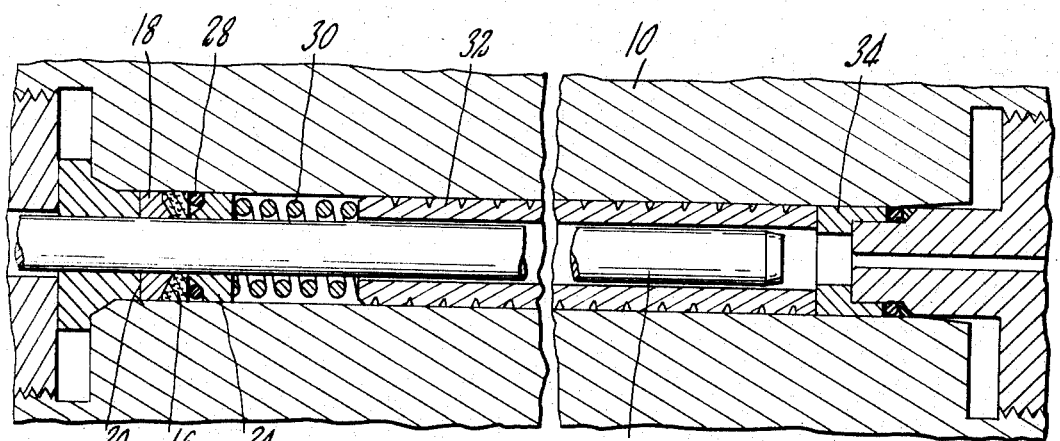
FIG. 1 is a sectional view in side elevation of a high pressure packing disposed between the movable piston and relatively stationary cylinder element.
Figure 2:
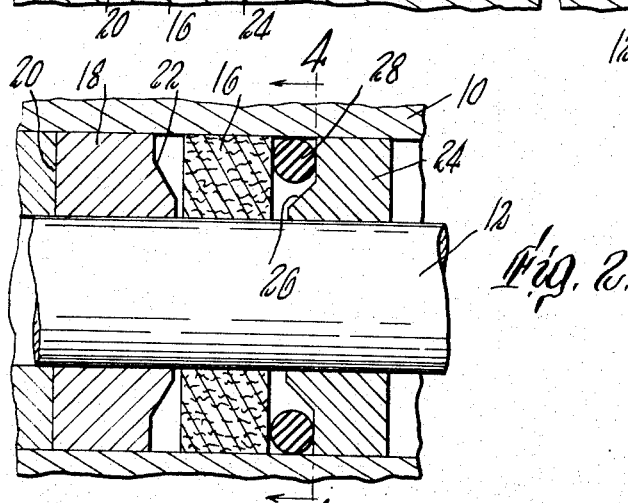
FIG. 2 is a detailed view on an enlarged scale of the high pressure packing shown in FIG. 1, the parts being shown in position before compression is applied.
Figure 3:
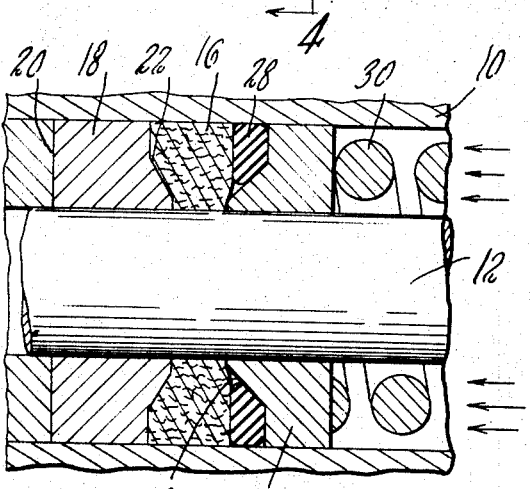
FIG. 3 is a view similar to FIG. 2 but with the parts shown in position after the packing has been fully pressurized.
Figure 4:
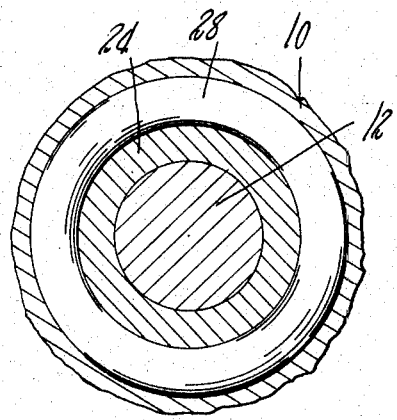
FIG. 4 is a sectional view taken on a line 4—4 of FIG. 2.

Referring to the drawing a high pressure cylinder and piston assembly is illustrated comprising a relatively stationary cylinder 10 and an axially movable piston 12 which acts when driven to the right as shown in FIG. 1 to build up in the cylinder a pressure which may be in the order of 200,000 p.s.i. The packing assembly comprises an annular leather packing 16 which may comprise one or a plurality of layers of leather. A header in the form of a bronze ring 18 supported against a fixed shoulder 20 forming one end of the recessed portion of the cylinder 10 in which the packing is mounted provides support for the packing 16 on the down stream side. It will be noted that the packing engaging face of the bronze ring 18 is sloped from its inner to its outer edge away from the leather packing 16 as indicated at 22. An upstream header in the form of a bronze ring 24 is provided at the upstream side of the leather packing 16, and is similarly provided with a packing engaging face 26 which slopes from its inner edge to its outer edge away from the leather packing 16. The annular recess thus formed in the face of ring 24 provides a pocket in which there is placed an O ring 28. The pocket formed by the sloping face 26 forces the O ring into a position to form a static seal between the leather packing and inner cylinder wall, and at the same time forms a protective pocket to prevent contact of the O ring with the moving piston 12. The high pressure piston packing thus set forth is maintained under an initial pressure by means of a coil spring 30 inserted between the upstream header bronze ring 24 and a spacer sleeve 32 which at its upper end abuts a header 34 which forms the end of the cylinder 10. My improved high pressure piston packing operates in the following manner:

The leather packing 16 is shown in FIG. 2 as having initially a substantially rectangular cross section. As pressure is applied leather packing 16 will be conformed to a shape imposed thereon by the opposed end faces 22 and 26 of the respective header bronze rings 18 and 24, so that the inner piston engaging surface of the leather packing will be substantially shorter than the outer cylinder wall engaging surface. The O ring 28, protected by the pocket formed by the outwardly sloped face 26 of the upstream header bronze ring 24 will be tightly pressed against the end face of the leather packing 16 and against the adjacent supporting wall of the cylinder 10 thus forming an initial seal between the packing and said cylinder wall. As the upstream pressure is now increased, for example, by endwise movement of the piston 12 to the right to a very high value which may be in the order of 200,000 p.s.i., the leather packing will conform generally to the shapes of the adjacent end faces of the header bronze rings 18 and 24 so that a relatively large area of external surface of the leather packing 16 is engaged against the relatively stationary supporting wall of the stationary cylinder 10 whereas a relatively small area of the internal surface of the ring-shaped leather packing 16 is engaged against the relatively moving cylinder 12. With this construction I have found that the preliminary static seal provided by the O ring 28 and packing 16 with the internal periphery of the cylinder will hold as the pressure against the packing is built up causing the packing to be deformed inwardly against the traveling cylinder 12 with sufficient pressure to form a most efficient seal also with the external surface of the moving piston 12 which entirely eliminates leakage through the packing.

The invention having been described, what is claimed is:

1. A packing assembly disposed between the piston and supporting cylinder elements of a high pressure cylinder unit, having, in combination, an annular leather packing interposed between the internal peripheral surface of said cylinder and the peripheral external surface of said piston, ring-type headers having leather packing confining faces supporting each of the downstream and upstream sides of said leather packing, each said header comprised of a hard nonyielding material, each said header having the leather packing extending between the cylinder and piston walls and sloped inwardly toward the opposing header the axial distance between said confining faces being greater adjacent said cylinder element than adjacent said piston element, said leather packing being conformed by said confining faces to provide a relatively short section of said leather engaging said piston peripheral surface and a substantially longer external surface engaging the internal peripheral surface of said cylinder, and an O ring confined between the upstream face of said leather packing, the outer portion only of the leather packing confining face of the adjacent header and said internal peripheral surface of said cylinder, spring means interposed between said cylinder and piston walls at the upstream side of said packing for maintaining an initial pressure against said upstream header, O ring, and leather packing, and shoulders fixed to the internal surface of the cylinder engaging respectively the downstream header and said spring at the upstream side of the packing assembly confining the packing assembly therebetween.

2. A packing assembly disposed between the opposed relatively moving walls of the piston and cylinder elements of a high pressure cylinder unit, having in combination, an annular leather packing interposed between said walls, ring type metallic headers having annular leather packing confining faces supporting each of the downstream and upstream sides of said leather packing, said headers and interposed leather packing being in relatively fixed relation to the wall of one of said piston and cylinder elements providing a static seal between the packing and said wall, and being in moving relation to the other said wall, each said header having the leather packing confining face thereof extending between the cylinder and piston walls, and sloped from said relatively fixed wall toward the opposing header, the axial distance between said confining faces being greater adjacent said relatively fixed wall than adjacent said relatively moving wall, said leather packing being conformed by said confining faces to provide a relatively short section of said leather engaging said moving wall, and a substantially longer section of said leather engaging said relatively fixed wall, a resilient O ring confined against said relatively fixed wall between adjacent portions of the upstream face of the leather packing and the adjacent header, means stressing said upstream header against said resilient O ring and leather packing to provide an initial static seal between the leather packing, the O ring and the relatively fixed wall, and shoulders fixed to said relatively stationary wall engaging respectively the downstream header and said stressing means at the upstream side of the packing assembly confining the packing assembly therebetween.

References Cited
UNITED STATES PATENTS

| | | | |
|---|---|---|---|
| 1,022,341 | 4/1912 | Sullivan | 277—118 X |
| 1,066,711 | 7/1913 | Cook | 277—118 X |
| 1,196,652 | 8/1916 | Brignoni | 277—117 X |
| 1,505,462 | 8/1924 | Hillman | 277—125 X |
| 2,374,960 | 5/1945 | Russell | 277—125 X |
| 3,004,783 | 10/1961 | Webb | 277—118 X |

LAVERNE D. GEIGER, *Primary Examiner.*

J. S. MEDNICK, *Assistant Examiner.*